US012753851B2

(12) United States Patent
Colombo

(10) Patent No.: US 12,753,851 B2
(45) Date of Patent: Oct. 6, 2026

(54) SYSTEM FOR FIXING COMPONENTS OF FLUID DISTRIBUTION UNITS

(71) Applicant: Renato Colombo, Desenzano del Garda (IT)

(72) Inventor: Renato Colombo, Desenzano del Garda (IT)

( * ) Notice: Subject to any disclaimer, the term of this patent is extended or adjusted under 35 U.S.C. 154(b) by 0 days.

(21) Appl. No.: 19/118,586

(22) PCT Filed: Oct. 9, 2023

(86) PCT No.: PCT/EP2023/077909

§ 371 (c)(1),
(2) Date: Apr. 4, 2025

(87) PCT Pub. No.: WO2024/079054

PCT Pub. Date: Apr. 18, 2024

(65) Prior Publication Data

US 2026/0110367 A1 Apr. 23, 2026

(30) Foreign Application Priority Data

Oct. 12, 2022 (IT) ........................ 102022000020982
Mar. 9, 2023 (IT) ........................ 102023000004374

(51) Int. Cl.
*F16K 27/00* (2006.01)

(52) U.S. Cl.
CPC .................................. *F16K 27/003* (2013.01)

(58) Field of Classification Search
CPC ..................................................... F16K 27/003
See application file for complete search history.

(56) References Cited

U.S. PATENT DOCUMENTS 6,546,960 B1 * 4/2003 Rohrberg .............. F16K 27/003 285/125.1
8,196,609 B2 * 6/2012 Oya ...................... F16K 27/003 137/884

(Continued)

FOREIGN PATENT DOCUMENTS

KR 101883370 B1 7/2018

OTHER PUBLICATIONS

International Search Report and Written Opinion mailed Jan. 30, 2024 in PCT/EP2023/077909 (12 pgs.).

(Continued)

*Primary Examiner* — Patrick C Williams
(74) *Attorney, Agent, or Firm* — Quicker Law, LLC

(57) ABSTRACT

A system for fixing components of fluid distribution units which comprises a supporting body defining an anchoring region and fixing elements for fixing at least one component of a fluid distribution unit to the anchoring region; anchoring elements for the component, and detachably coupling elements comprising engagement bodies, and at least one coupling body which is associated with the component and can be selectively engaged with at least one engagement body, the anchoring elements locking one coupling body with the respective engagement body; the engagement body comprises a male pivot element and the coupling body comprises a female seat engageable with the male pivot element, the anchoring elements comprising at least one body for connection between the engagement body and the coupling body, the anchoring elements comprising a connecting body engaged in openings defined on the coupling body and on the engagement body respectively.

13 Claims, 16 Drawing Sheets

(56) References Cited

U.S. PATENT DOCUMENTS

| | | | | |
|---|---|---|---|---|
| 8,985,153 | B2 * | 3/2015 | Didier ................. | F15B 13/0817<br>137/271 |
| 2003/0192607 | A1 * | 10/2003 | Wigmore ............ | F15B 13/0857<br>137/884 |
| 2004/0187943 | A1 * | 9/2004 | Bennett ................. | F16K 27/003<br>137/884 |
| 2006/0185746 | A1 * | 8/2006 | Doyle ................. | F15B 13/0896<br>137/884 |
| 2015/0000777 | A1 | 1/2015 | Twelftree | |

OTHER PUBLICATIONS

Search Report and Written Opinion mailed Apr. 25, 2023 in IT 102022000020982 (8 pgs.).

* cited by examiner

SYSTEM FOR FIXING COMPONENTS OF FLUID DISTRIBUTION UNITS

CROSS REFERENCE TO RELATED APPLICATIONS

This application is the National Stage of International Application No. PCT/EP2023/077909 filed Oct. 9, 2023, which claims priority to and the benefit of Italian Application No. 102022000020982 filed Oct. 12, 2022 and Italian Application No. 102023000004374 filed Mar. 9, 2023, the disclosures of all of which are incorporated herein by this reference in their entireties.

FIELD OF THE INVENTION

The present invention relates to a system for fixing components of fluid distribution units.

BACKGROUND OF THE INVENTION

Box-like bodies are known and are widely used for the installation—inside masonry walls, movable walls or the like—of components for the distribution of gas or water: such box-like bodies comprise a housing which defines internally a compartment adapted to accommodate the component or components to be installed, which are for example constituted by on-off valves arranged along the lines for feeding and/or distribution of the fluid.

Typically the housing has, on at least one of its side faces, connecting openings, which are connected to the compartment and which can be passed through by connection tubes to the component accommodated inside the compartment.

In some cases the housing is associated with a front flap which is adapted to pass between an open condition, in which the user is able to access the components accommodated inside the compartment, and a closed condition of the compartment.

In order to lock the components in position inside the compartment, fixing brackets or collars are normally used.

In some cases, adjustment slots are provided which make it possible to adjust the position, along a substantially horizontal direction, of the collars or of the brackets.

The use of such supports is in some cases rather inconvenient, especially if the components are to be accommodated inside compartments defined by boxes to be arranged inside walls or partitions.

Furthermore, the known solutions do not allow optimization of the positioning in space of the individual components.

BRIEF SUMMARY OF THE INVENTION

The aim of the present invention is to provide a system for fixing components of fluid distribution units which is capable of improving the known art in one or more of the above-mentioned aspects.

Within this aim, an object of the invention is to provide a system for fixing components of fluid distribution units that makes it possible to optimize the positioning of the various components so as to reduce the overall bulk of the system.

Not least an object of the invention is to provide a system for fixing components of fluid distribution units that is highly reliable, easy to implement and at low cost.

This aim and these and other objects which will become better apparent hereinafter are achieved by a system for fixing components of fluid distribution units according to claim 1, optionally provided with one or more of the characteristics of the dependent claims.

BRIEF DESCRIPTION OF THE DRAWINGS

Further characteristics and advantages of the invention will become more apparent from the description of some preferred, but not exclusive, embodiments of the system for fixing components of fluid distribution units according to the invention, which are illustrated for the purposes of non-limiting example in the accompanying drawings wherein.

DETAILED DESCRIPTION OF THE INVENTION

Figure 1:
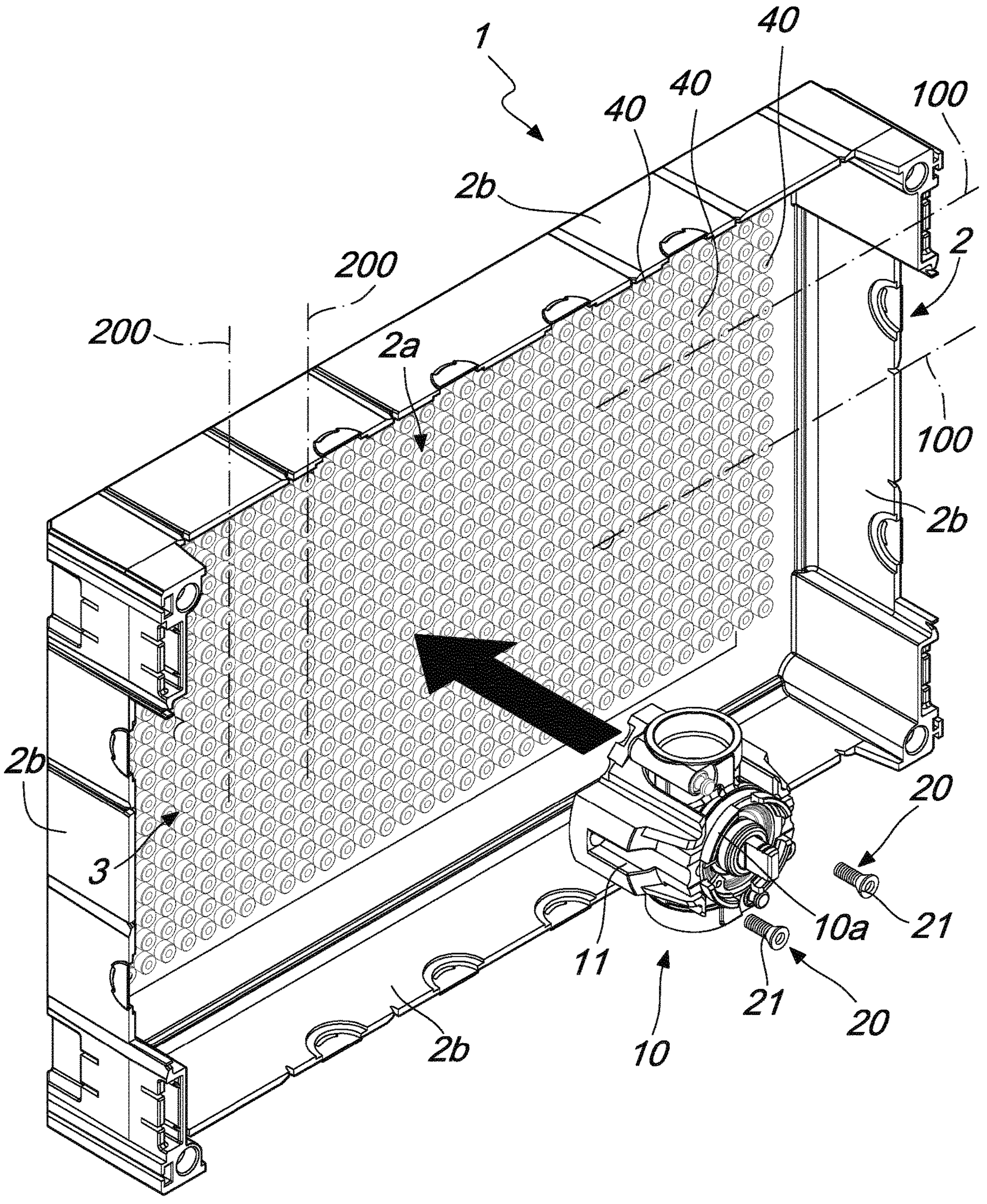
FIG. 1 is a perspective view of the system according to the invention in which the component is constituted by a valve and is separated from the anchoring region.

With reference to the figures, the system for fixing components of fluid distribution units according to the invention, generally designated by the reference numeral 1, comprises a supporting body 2 which defines an anchoring region 3 and means for fixing at least one component 10 of a fluid distribution unit to the anchoring region 3.

With reference to the embodiment shown in the figures, the supporting body 2 comprises a box-like body constituted by a housing which defines internally a compartment designed to arrange at least one component 10 to be installed.

The housing comprises, for example, a back wall 2*a* and a lateral containment portion 2*b*. The surface of the back wall that is directed toward the compartment defines, preferably, the anchoring region 3.

Obviously, the supporting body 2 can be constituted by a plate-like body which defines, on one of its faces, the anchoring region 3 and optionally is provided with conventional means for coupling to a wall or to a structure in general.

According to the present invention, the fixing means comprise coupling means for detachably coupling the component 10 to the anchoring region 3 in order to arrange the above-mentioned component 10 at a desired position defined on the anchoring region 3, and means for stably anchoring 20 the component at the above-mentioned desired position.

In particular, the detachably coupling means comprise a plurality of engagement bodies 40 defined at the anchoring region 3, which are arranged mutually spaced apart along substantially mutually parallel rows 100, and at least one coupling body 41 which is associated or can be associated with the component 10.

The coupling body 41 can be engaged selectively with at least one respective engagement body 40 in order to position the component in the desired position.

The stably anchoring means 20 are configured to stably lock at least one coupling body 41 with the respective engagement body 40 once the at least one coupling body 41 is selectively engaged with the respective engagement body 40.

Figure 2:
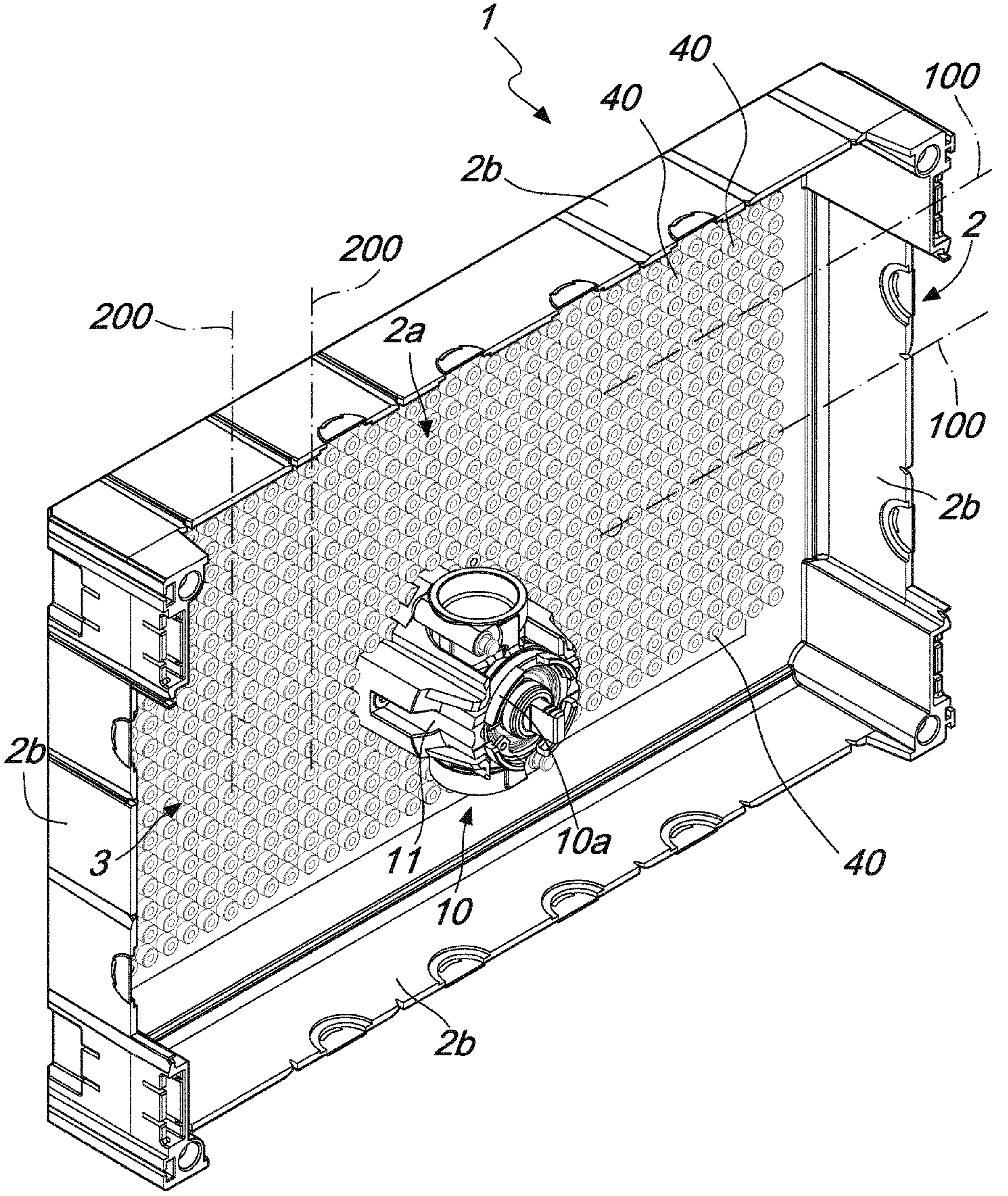
FIG. 2 is a view similar to the previous view of the component anchored to the anchoring region.
Figure 3:
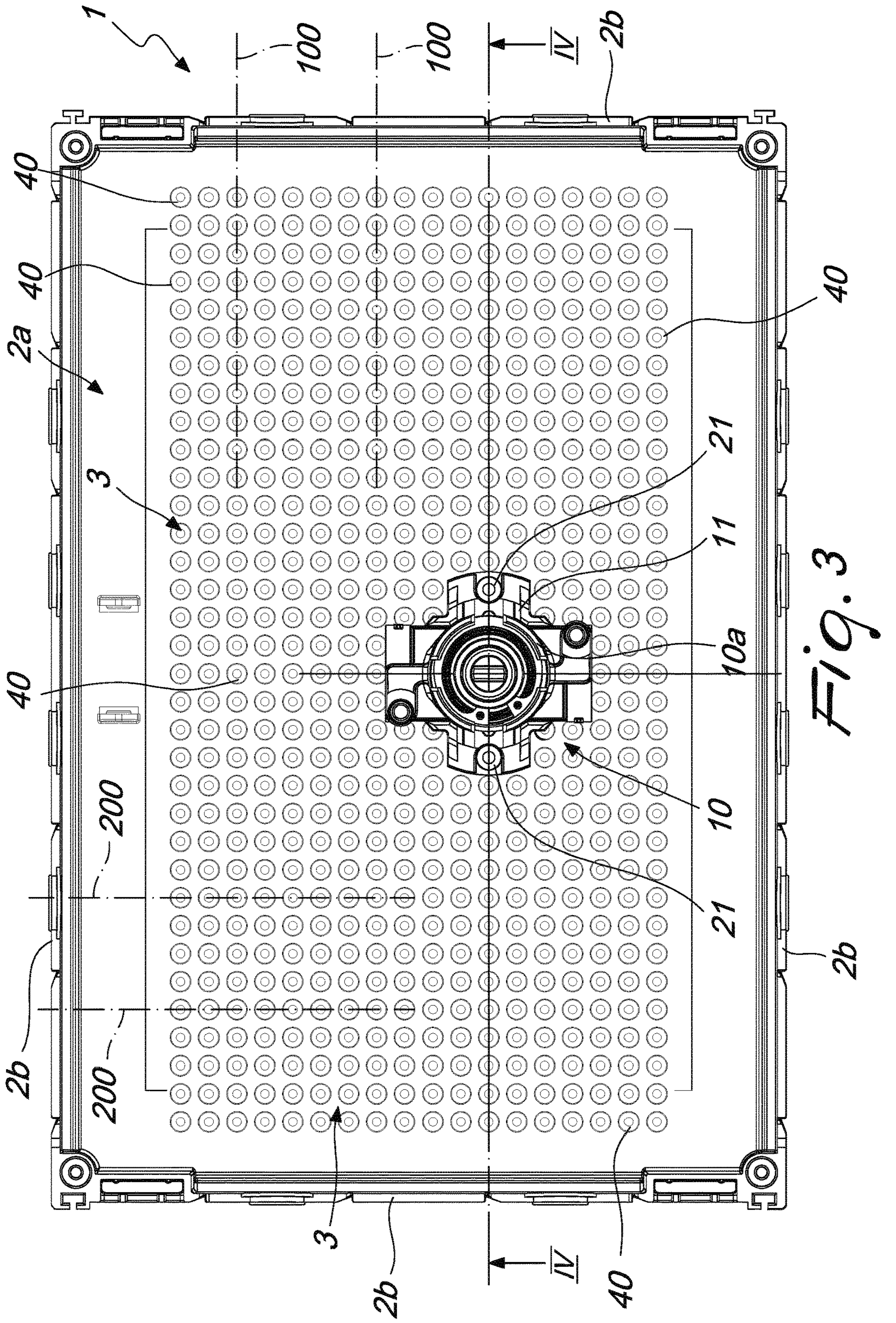
FIG. 3 is a view from above of FIG. 2.
Figure 4:
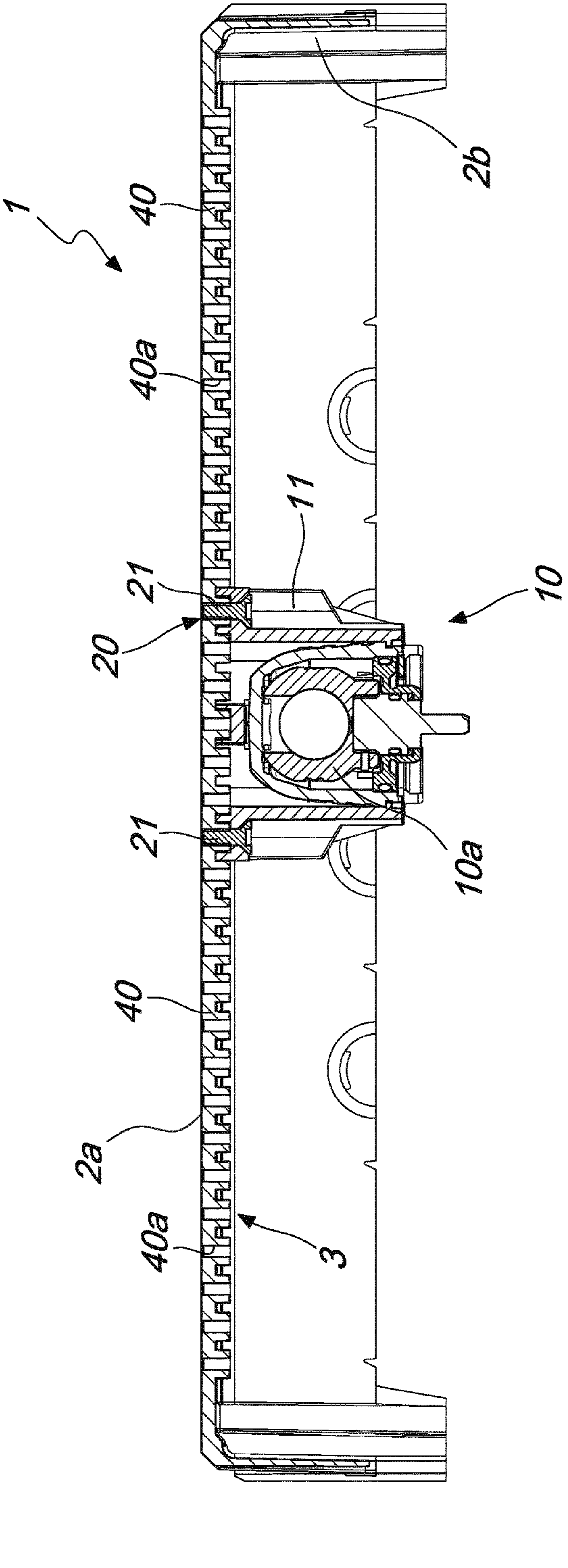
FIG. 4 is a cross-sectional view taken along the line IV-IV in FIG. 3.
Figure 5:
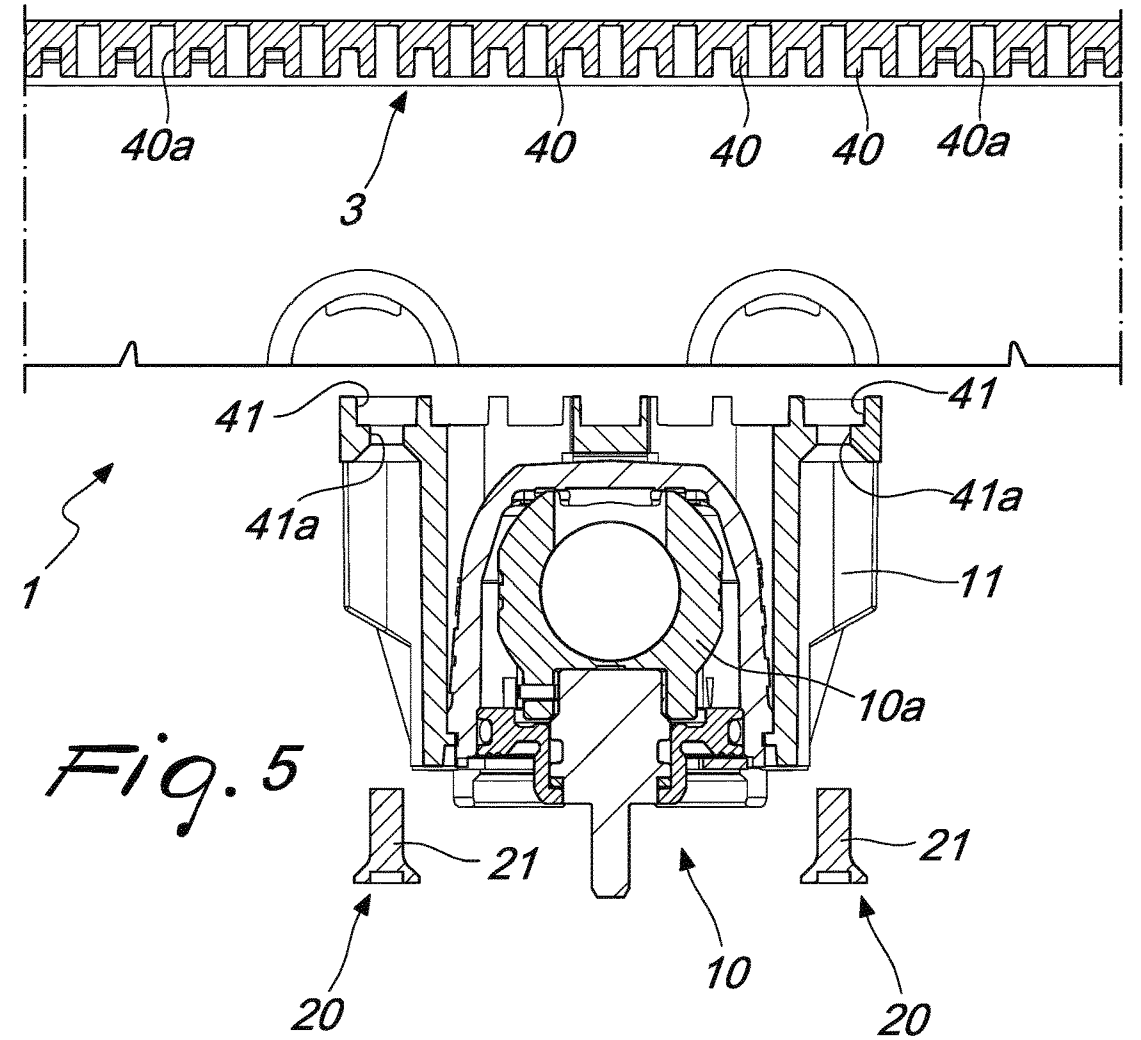
FIG. 5 is an exploded enlargement of a portion of the cross-section of FIG. 4.
Figure 6:
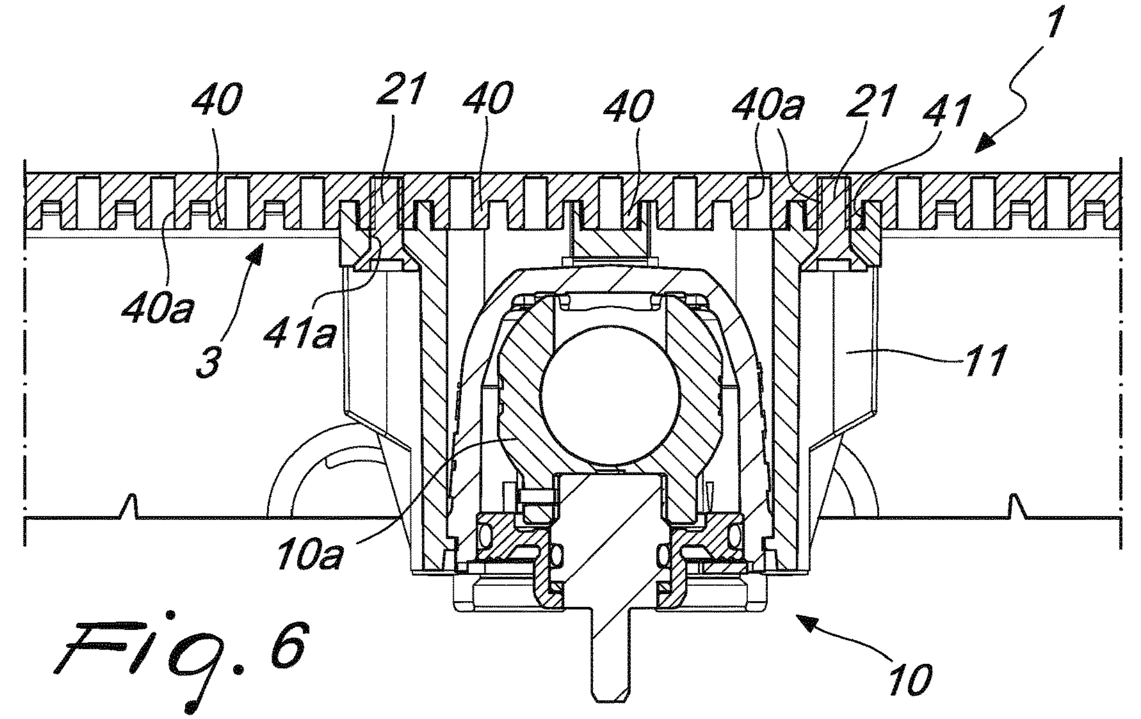
FIG. 6 is an enlargement of a portion of the cross-section of FIG. 4.
Figure 7:
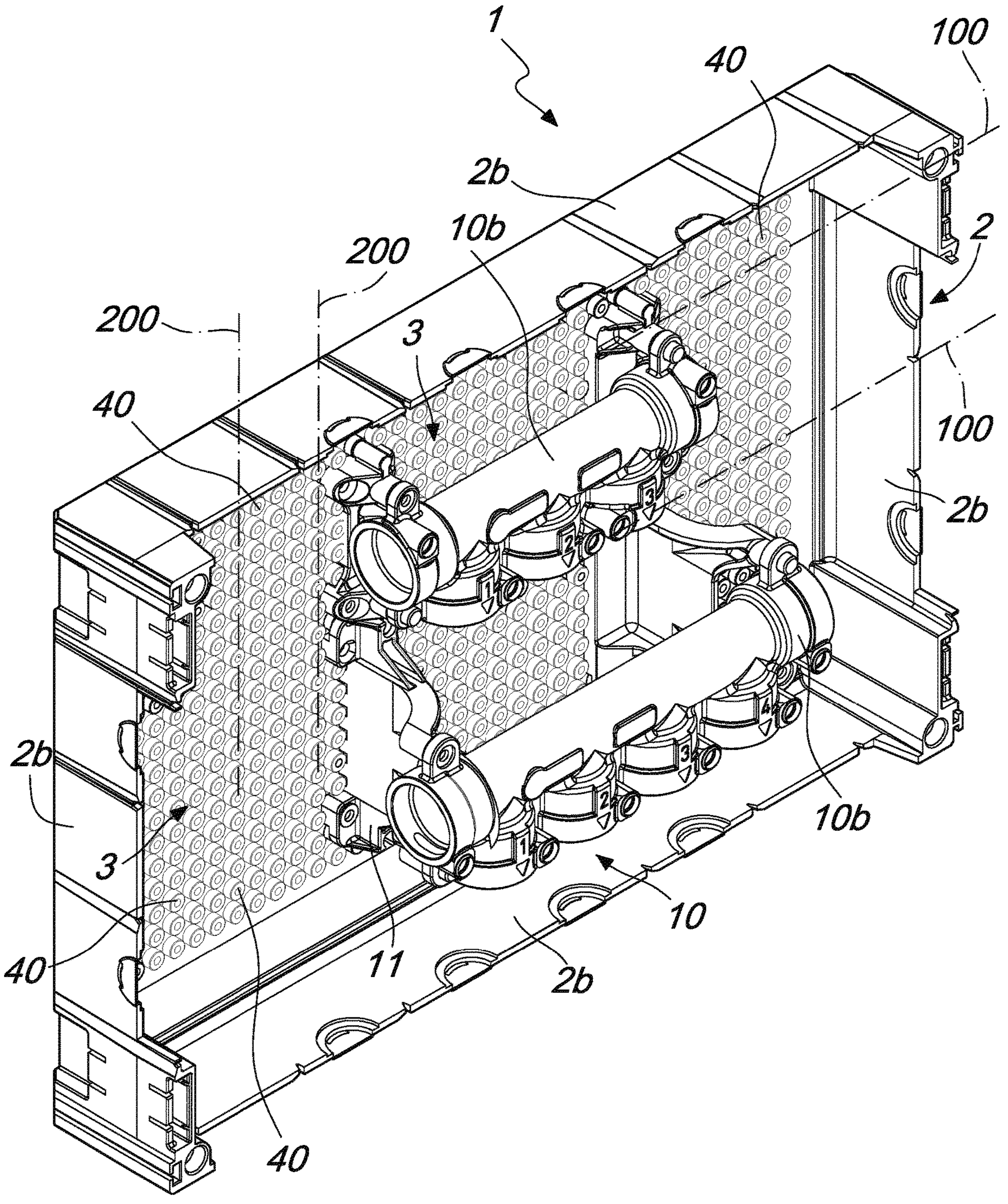
FIG. 7 is a view similar to that of FIG. 2 in which the anchoring region is associated with manifolds.
Figure 8:
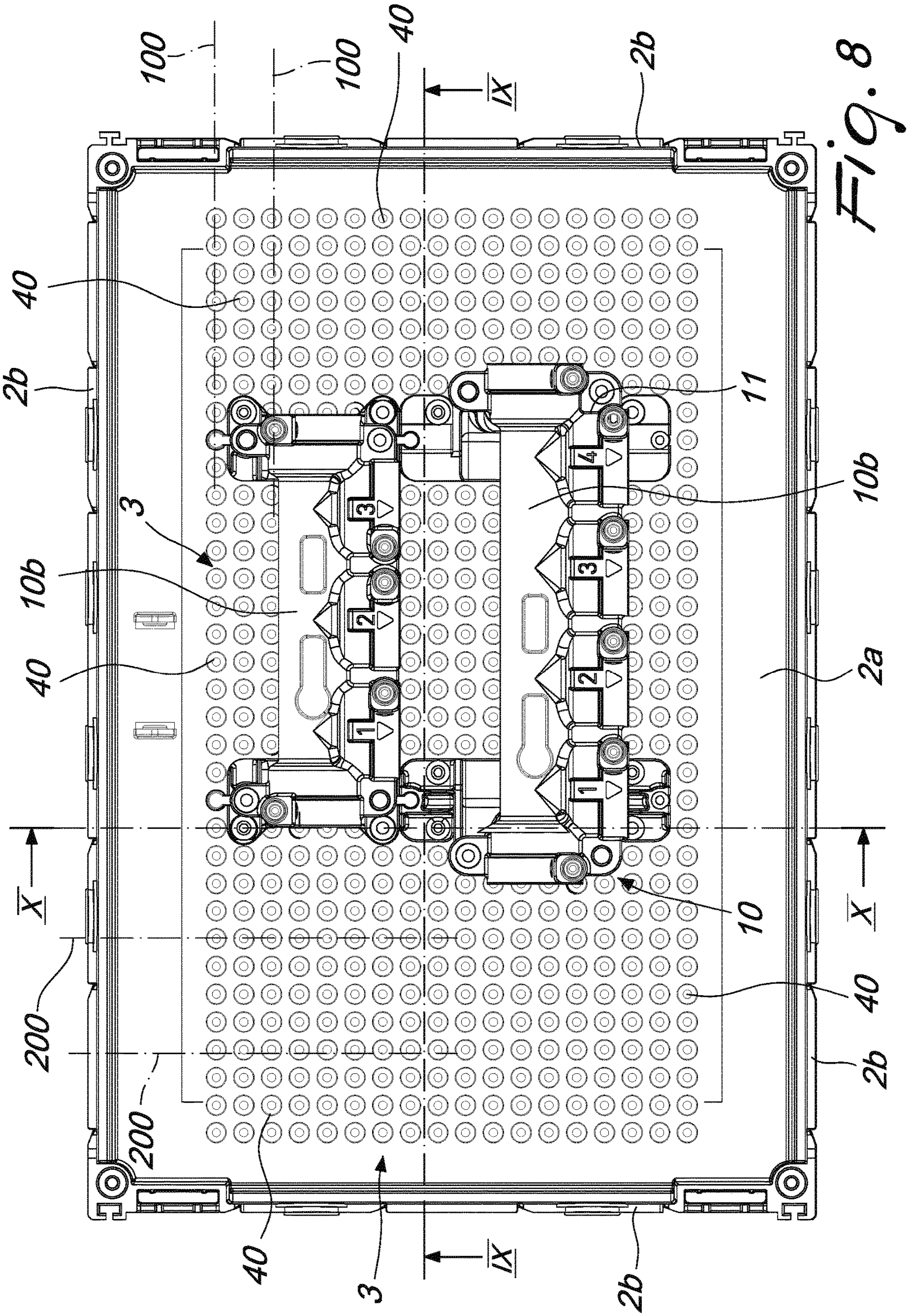
FIG. 8 is a view from above of the system shown in FIG. 7.
Figure 9:
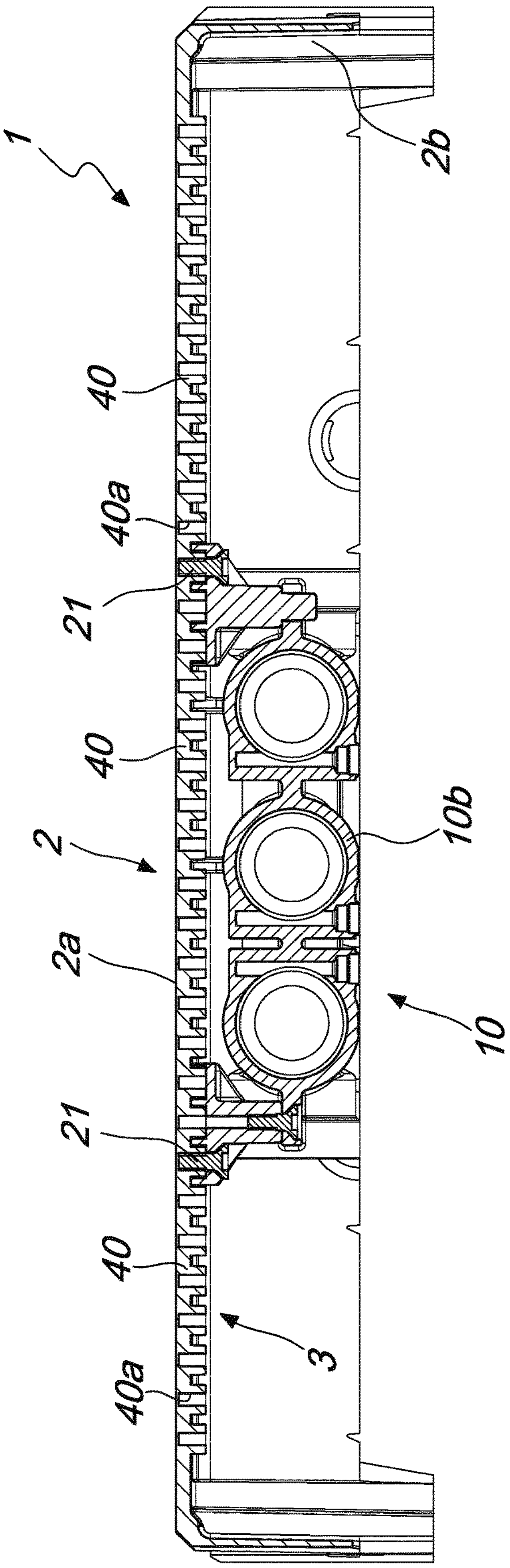
FIG. 9 is a cross-sectional view taken along the line IX-IX in FIG. 8.
Figure 10:
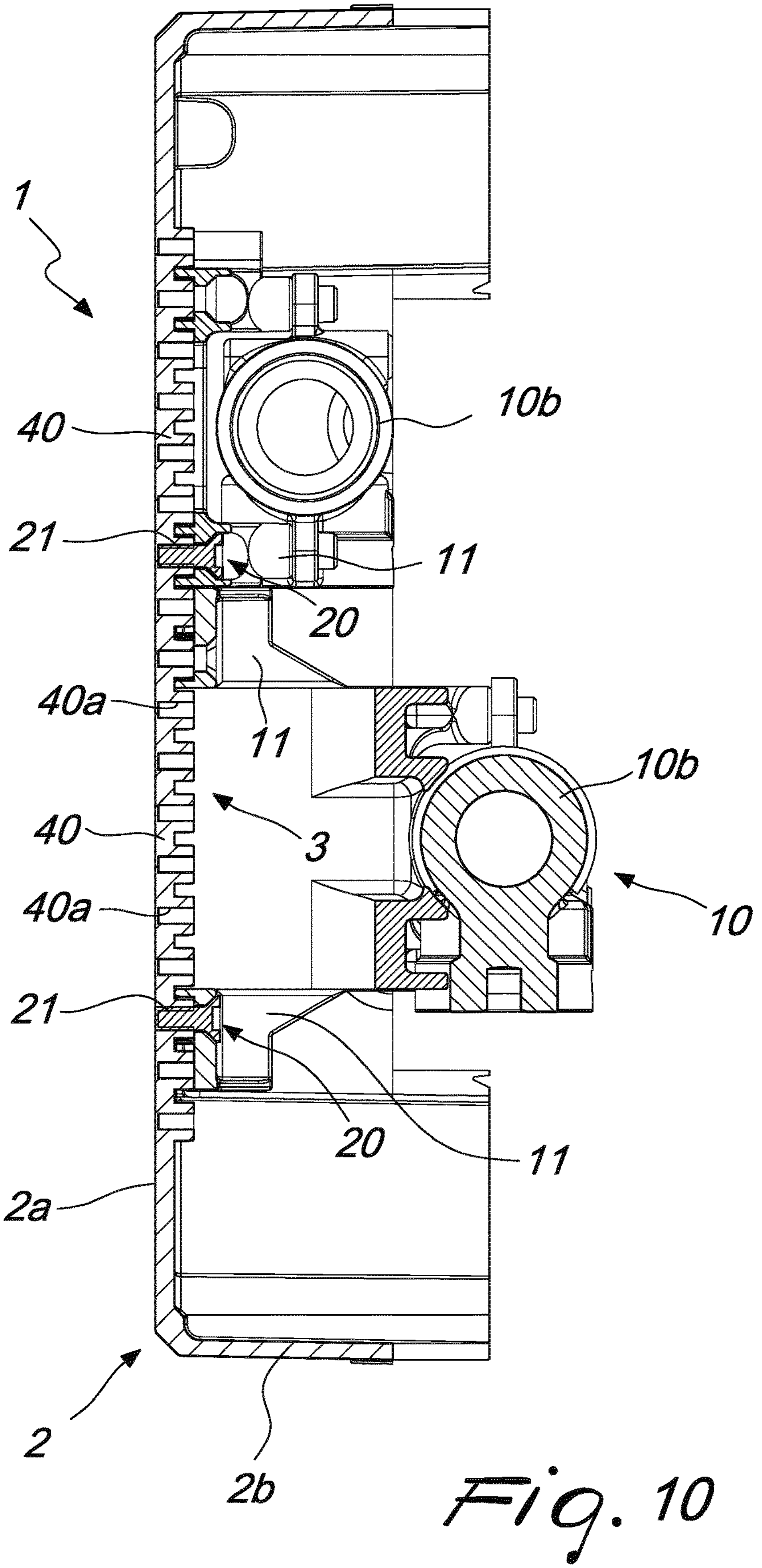
FIG. 10 is a cross-sectional view taken along the line X-X in FIG. 8.
Figure 11:
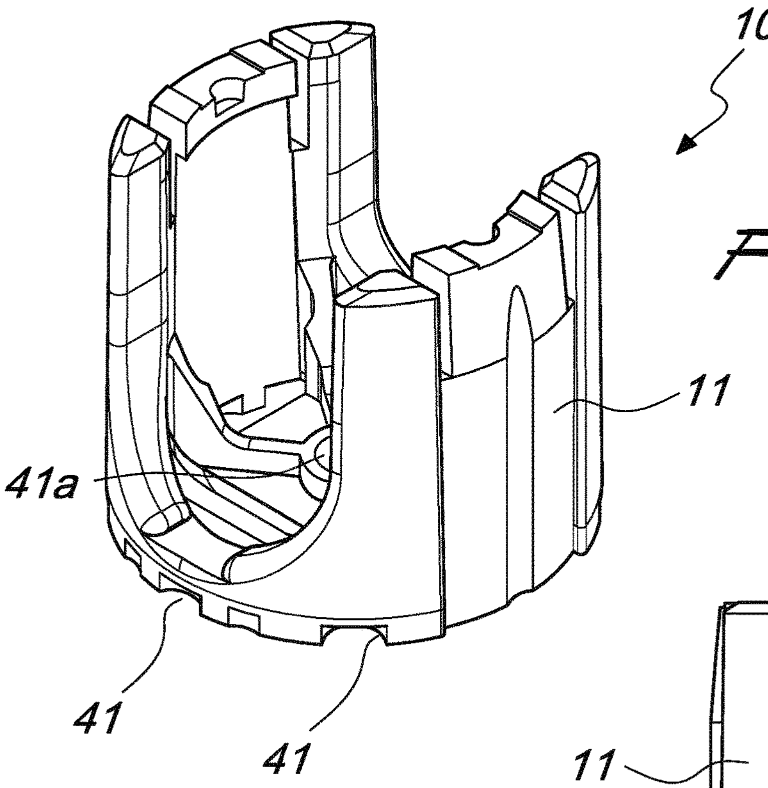
FIG. 11 is a perspective view of another embodiment of the supporting body shown in FIGS. 1 to 6.
Figure 12:
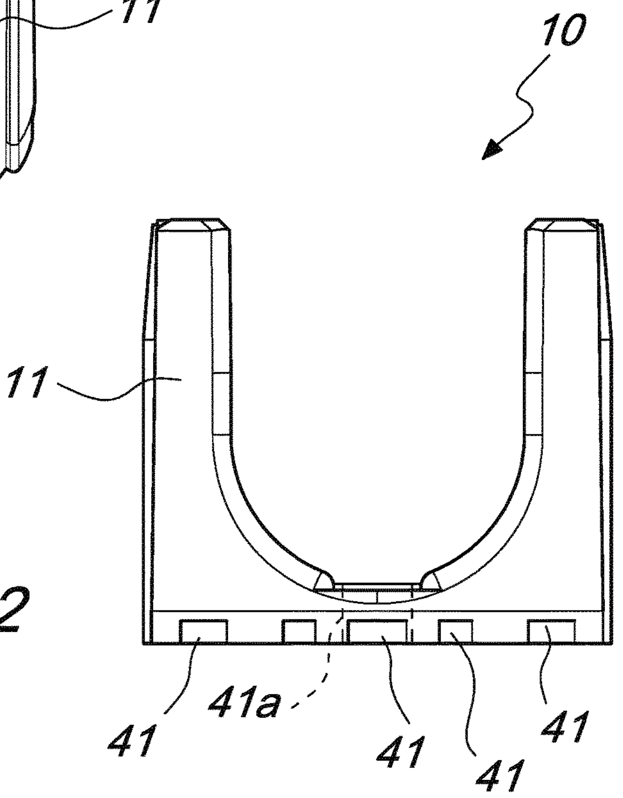
FIG. 12 is a side view of the supporting body in FIG. 11.
Figure 13:
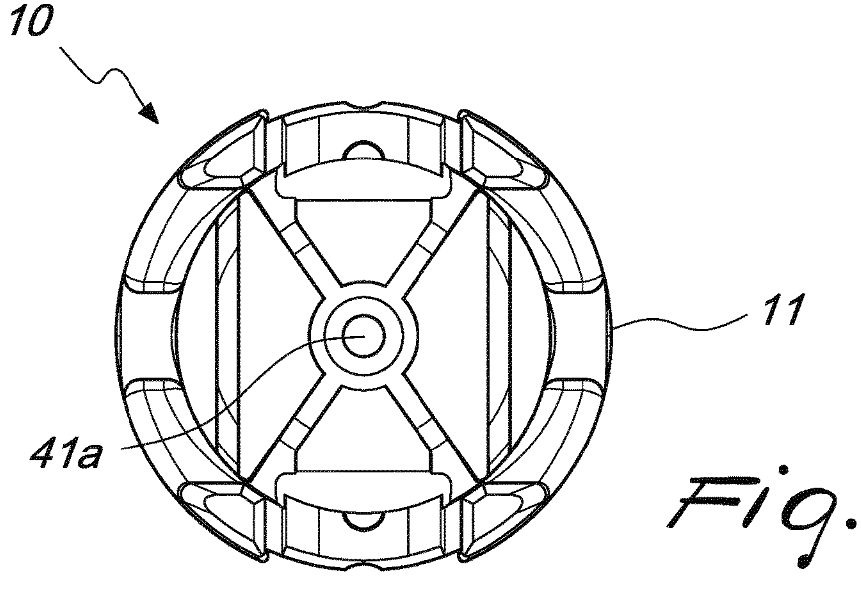
FIG. 13 is a view from above of the supporting body of FIG. 11.

It is possible for the coupling body or bodies 41 to be defined at supporting bodies 11 that are associated with a rapid connection element for the component 10 to be installed (as shown in FIGS. 1 to 6), or at brackets with which to associate the component 10 using screws (as shown in FIGS. 7 to 10) or using fixing collars or ties.

Obviously, the same supporting body 11 can be associated with multiple components 10 to be installed.

The supporting body 11 can also be provided in a single piece with the component 10 to be installed.

Preferably, the engagement body 40 comprises a male pivot element which protrudes from the anchoring region 3, while the coupling body 41 comprises a female seat, which is shaped complementarily to the male pivot element and is detachably engageable with the male pivot element.

The engagement bodies 40 and the coupling bodies 41 extend along a respective longitudinal axis.

This longitudinal axis corresponds substantially to the direction of coupling and uncoupling between the coupling body 41 and the respective engagement body 40.

According to a preferred embodiment, the plurality of engagement bodies 40 is arranged in a matrix on rows 100 and columns 200 which are substantially perpendicular to each other.

In particular, the engagement bodies 40 between adjacent rows 100 and between adjacent columns 200 are equally spaced apart.

This greatly facilitates the positioning, in the two directions horizontal and vertical, even if the supporting body has two or more coupling bodies 41 which, in this case, are mutually spaced apart at the same pitch or at multiples of the pitch defined between adjacent rows 100 and columns 200.

Preferably, the engagement bodies 40 are made of plastic.

With reference to the embodiment shown in the figures, the stably anchoring means 20 comprise at least one body for connection between a portion of the engagement body 40 and a portion of the coupling body 41 associated with it.

In particular, the stably anchoring means 20 comprise an elongated connecting body 21, which can be engaged in respective openings 41*a*, 40*a* which are defined respectively on the coupling body 41 and on the engagement body 40.

The openings 41*a*, 40*a* extend around the respective longitudinal axes of the respective coupling bodies 41 and engagement bodies 40.

Advantageously, the longitudinal axes extend, in use, substantially perpendicular to the plane of arrangement of the plate-like body which defines, on one of its faces, the anchoring region 3.

Specifically, the openings 41*a*, 40*a* extend along respective longitudinal axes which are designed to collimate when the coupling body 41 is associated with the engagement body.

The opening 41*a* defined on the coupling body 41 is, preferably, a through opening.

Advantageously, the elongated connecting body 21 comprises a self-tapping screw.

In this manner, the engagement of the elongated connecting body 21, for example constituted by a self-tapping screw, inside the openings 41*a*, 40*a* occurs in an extremely practical manner, head-on with respect to the anchoring region 3, so as to facilitate its engagement, and if applicable, its disengagement, using a tool such as for example a screwdriver.

Furthermore, the insertion of the elongated connecting body 21 coaxially to the direction of extension of the engagement body 40 makes it possible to use engagement bodies 40 and respective coupling bodies 41, with reduced longitudinal extension, thus making it possible to apply the component 10 on the anchoring region 3 so as to reduce the depth necessary for installation.

In particular, each supporting body 11 (or the component 10 directly) has at least two coupling bodies 41 arranged mutually spaced apart and at the same pitch with respect to the distance between adjacent engagement bodies 40. This characteristic enables an extremely precise positioning along the rows 100 and the columns 200, as well as enabling the stable fixing using an extremely low number of anchoring means 20, at a minimum just one.

In fact, the anchoring means 20 make it possible to stably keep all the coupling bodies 41 engaged with the respective engagement bodies 40, and this engagement is sufficient to contrast any actions or forces acting on the plane parallel to the anchoring region 3, while actions and forces perpendicular to this plane are defeated by the action of the anchoring means 20.

For the purposes of example, the component 10 comprises, a valve 10*a* or a manifold 10*b*.

Figure 14:
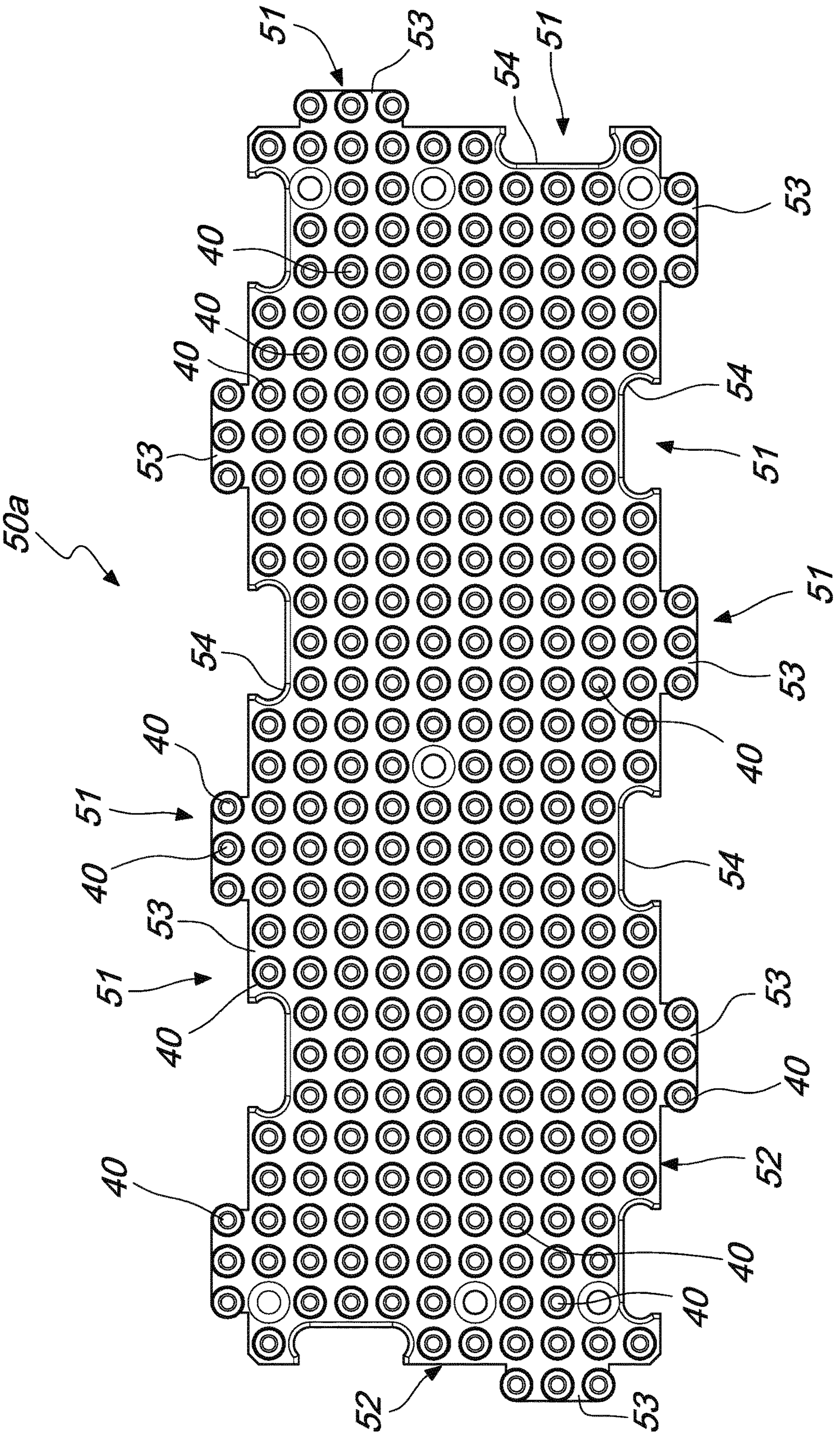
FIG. 14 is a front elevation view of a first plate-like element.
Figure 15:
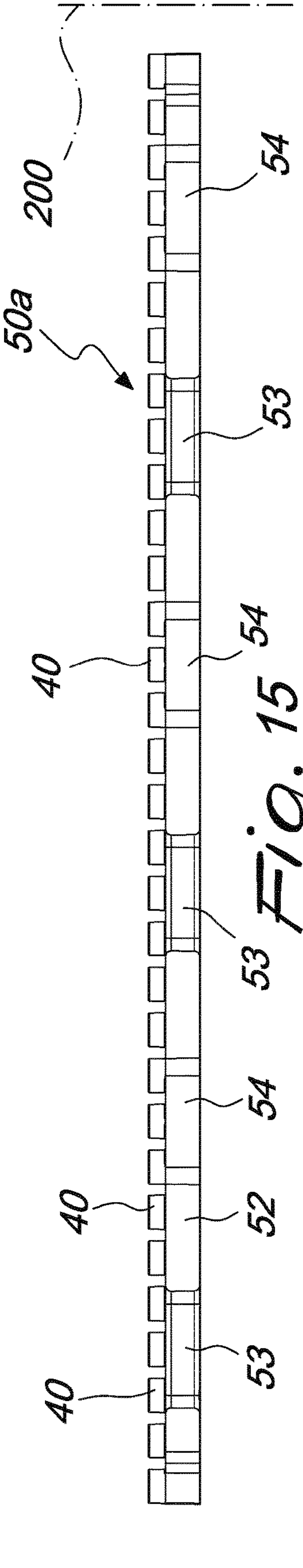
FIG. 15 is a side view of the first plate-like element of FIG. 14.
Figure 16:
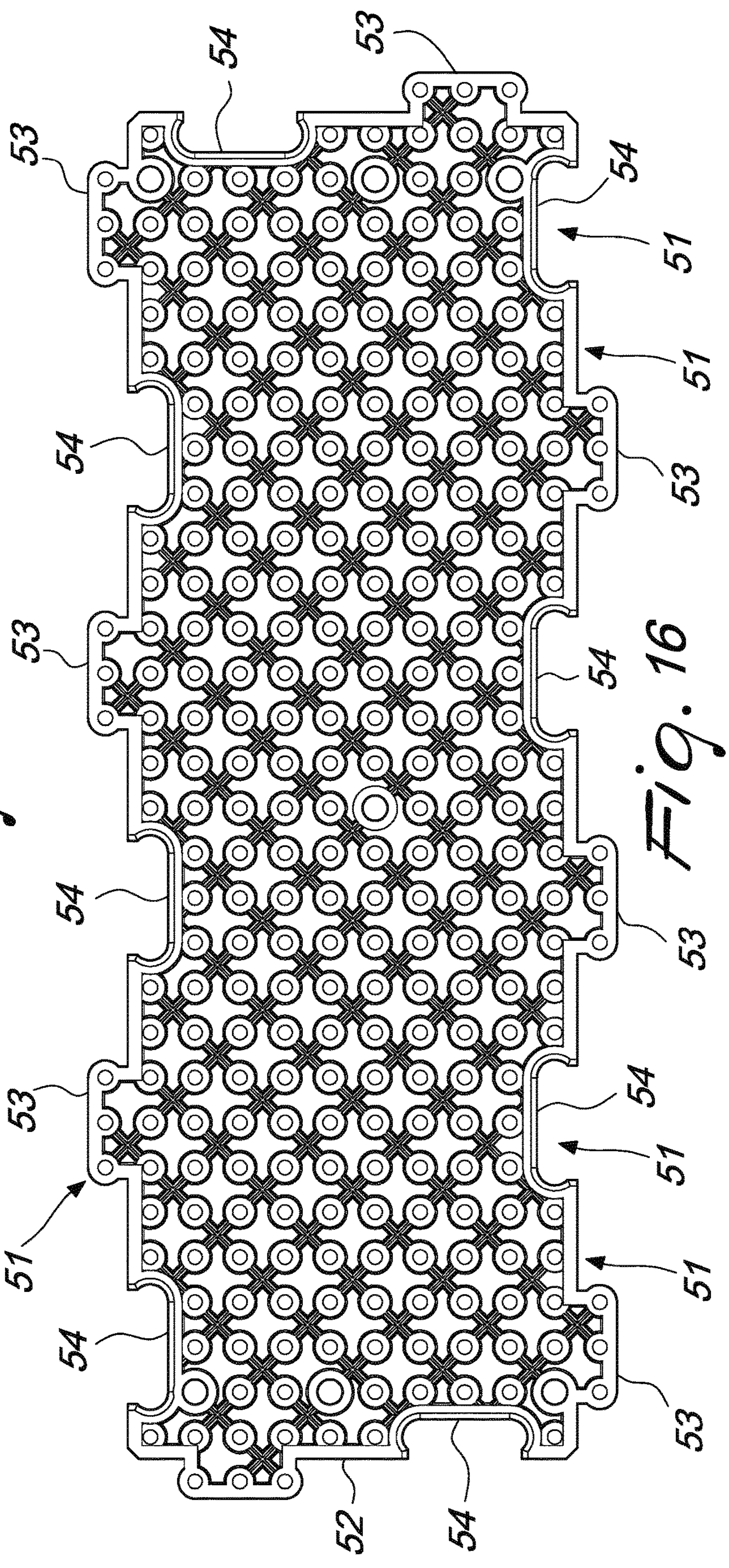
FIG. 16 is an elevation view from behind of the first plate-like element of FIG. 14.
Figure 17:
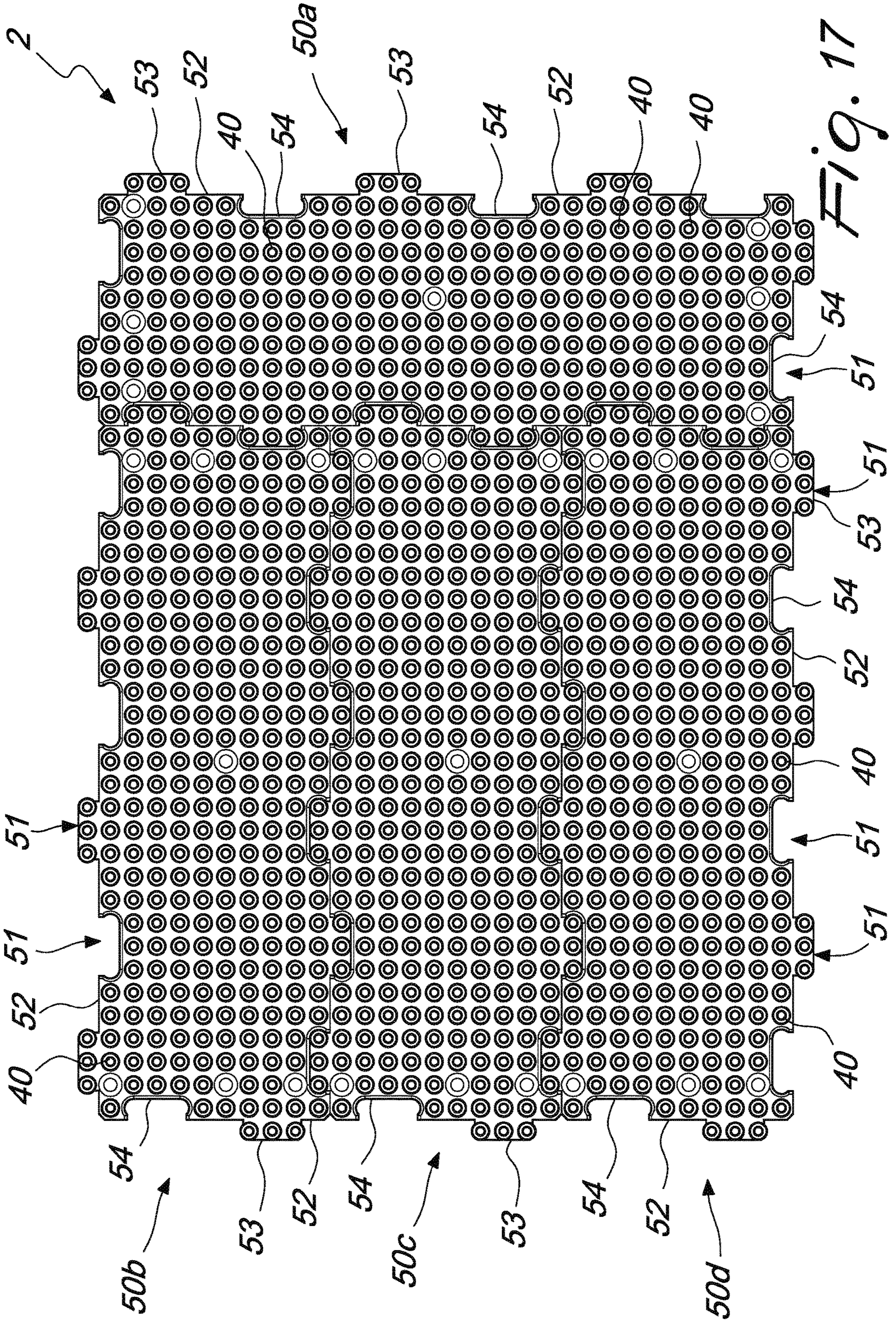
FIG. 17 is a front elevation view of a supporting body defined by four plate-like elements of the type shown in FIGS. 14 to 16.
Figure 18:
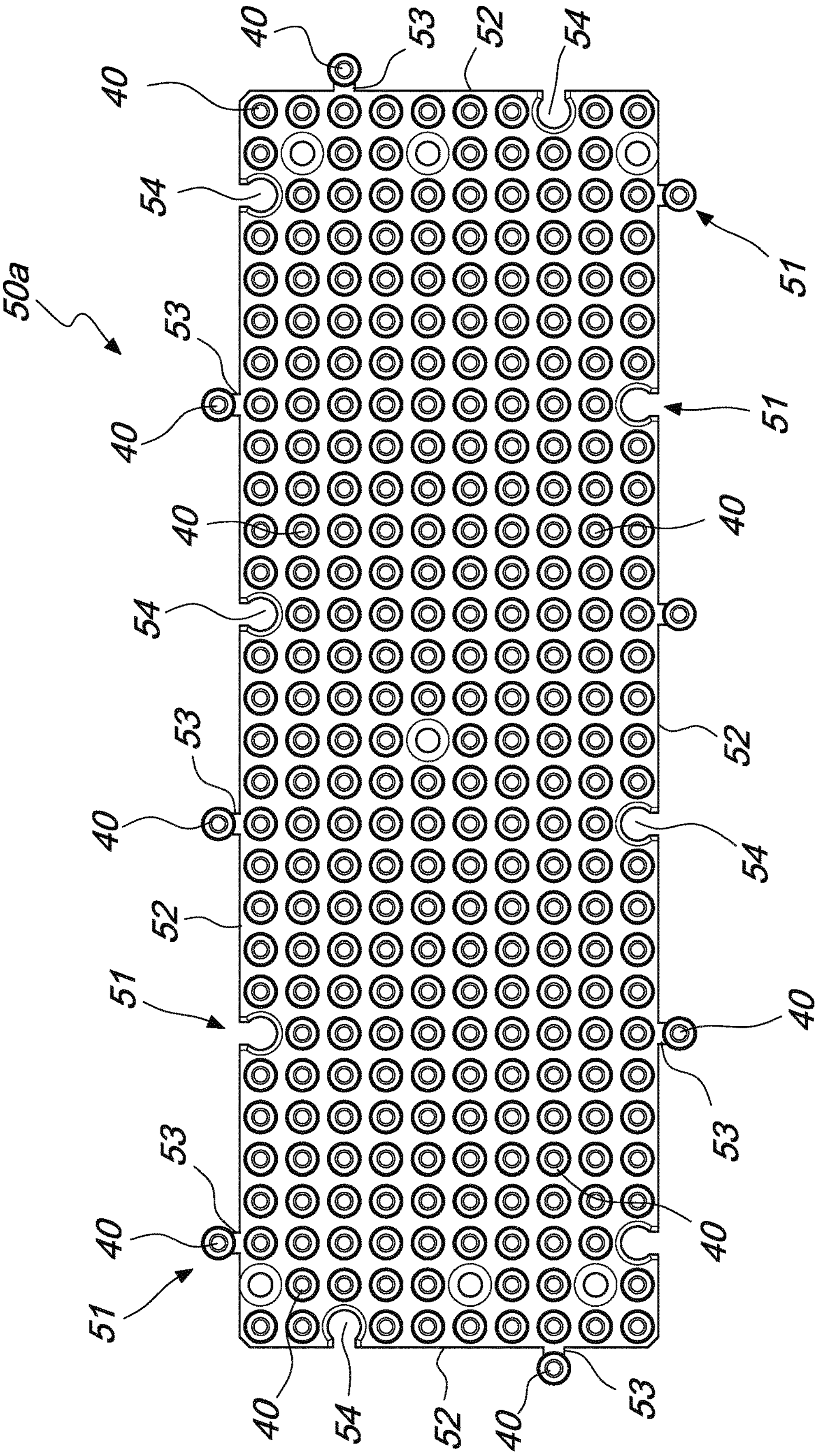
FIG. 18 is a front elevation view of another embodiment of the first plate-like element.
Figure 19:
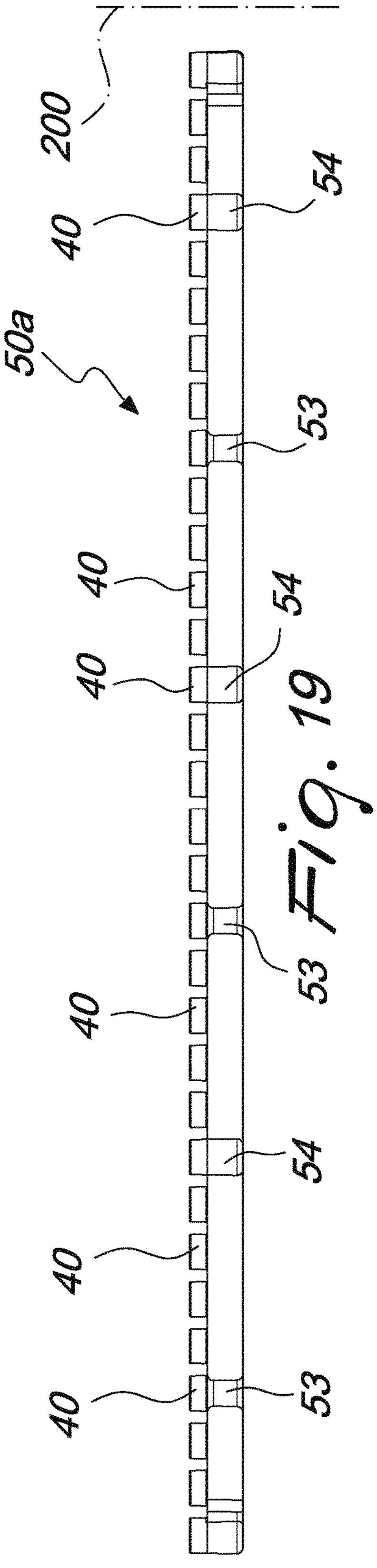
FIG. 19 is a side view of the first plate-like element of FIG. 18.
Figure 20:
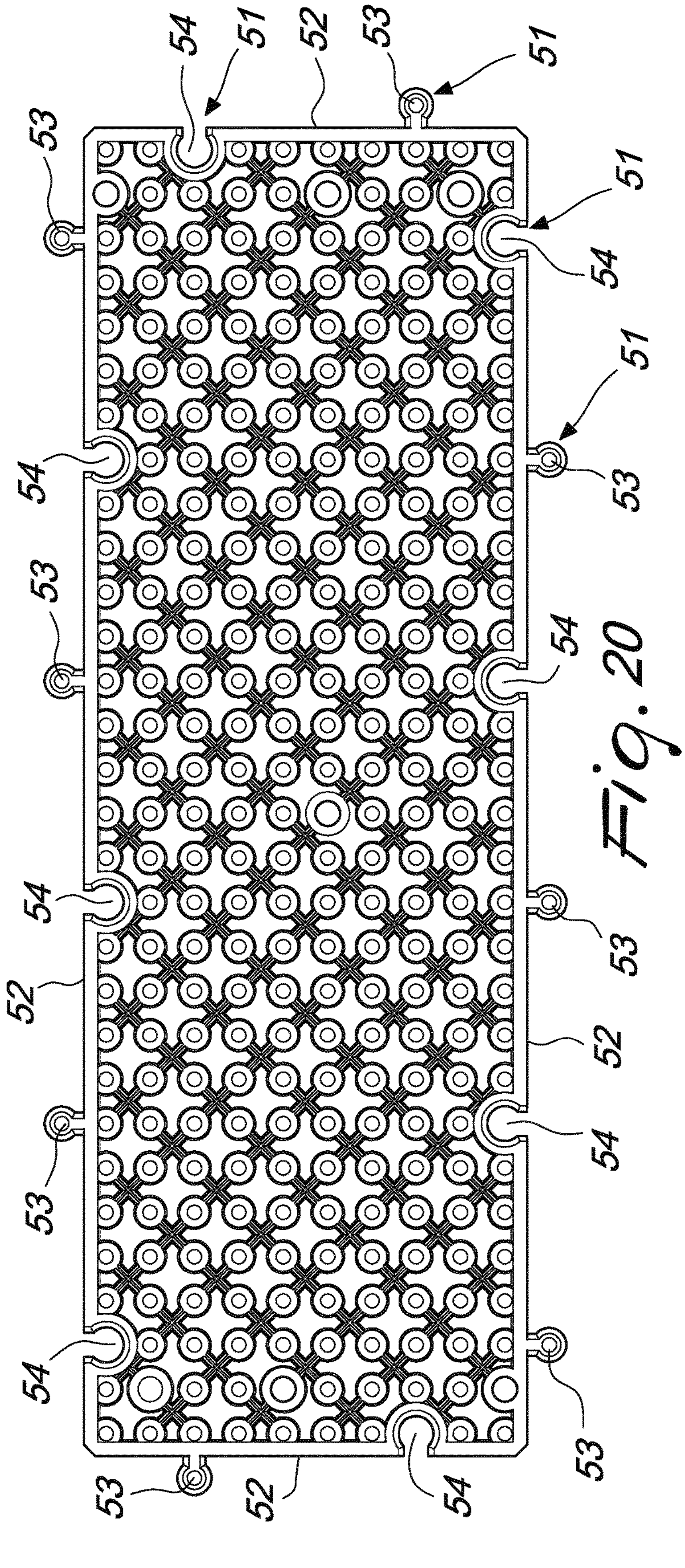
FIG. 20 is an elevation view from behind of the first plate-like element of FIG. 18.
Figure 21:
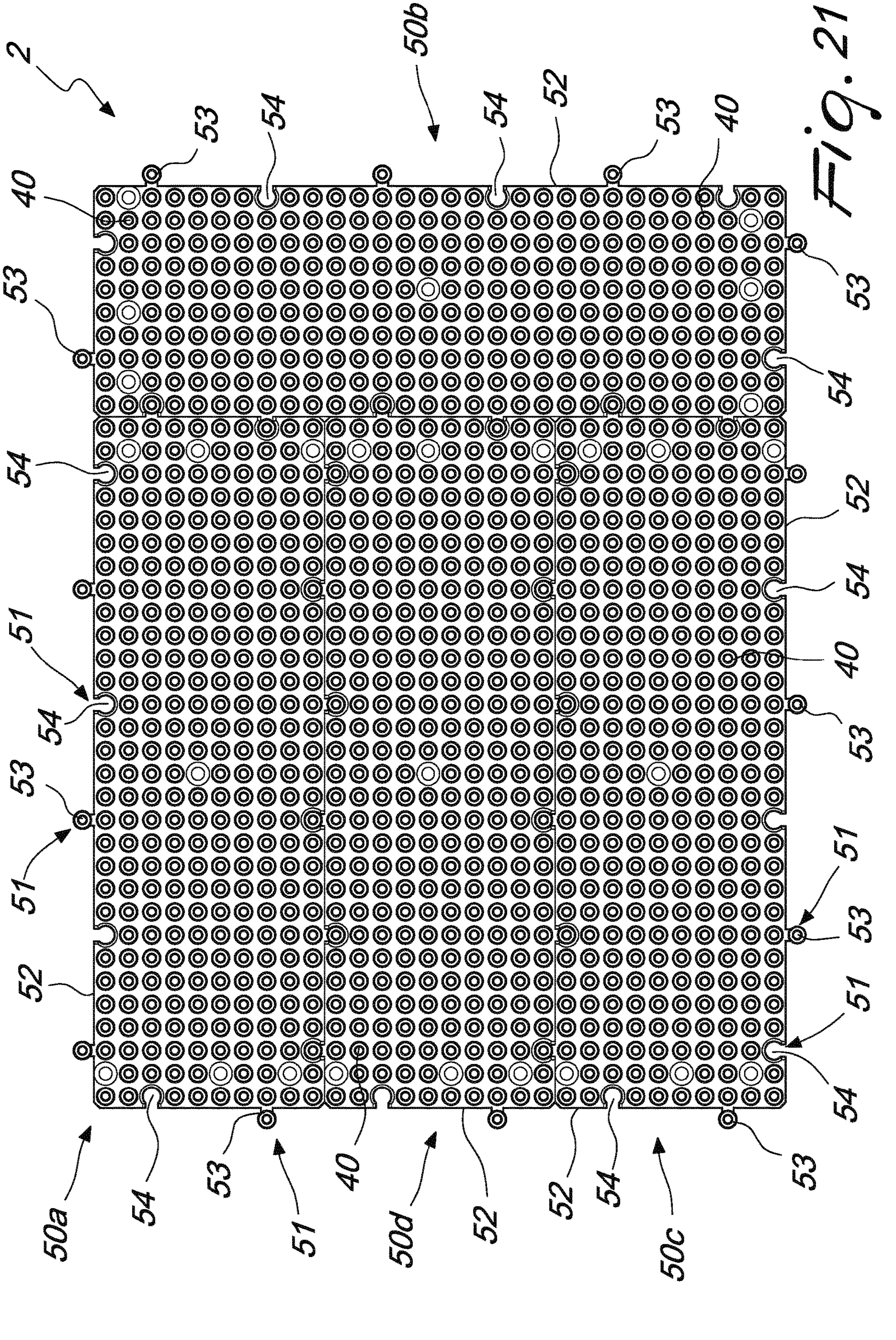
FIG. 21 is a front elevation view of a supporting body defined by four plate-like elements of the type shown in FIGS. 18 to 20.

With reference to FIGS. 14 to 21, according to a particularly important aspect of the present invention, the system 1 is provided with the supporting body 2 which comprises a first and at least one second plate-like element 50*a*, 50*b*, etc.

The first and the at least one second plate-like element 50*a*, 50*b*, etc. have coupling means 51 arranged at the respective perimeter edge 52.

The coupling means 51 are, in particular, configured with the first plate-like element 50*a* and the second plate-like element 50*b* mutually coupled, to keep at the same pitch engagement bodies 40 that are arranged mutually adjacent and supported, respectively, by the first and by the second plate-like element 50*a*, 50*b*.

Preferably, the coupling means 51 comprise a contouring of the respective perimeter edge 52 of the plate-like elements 50*a*, 50*b*.

With reference to the embodiments shown in FIGS. 14 to 21, the contouring of the perimeter edges 52 of the plate-like elements 50*a*, 50*b* comprises male protrusions 53 and female recesses 54 contoured correspondingly to the male protrusions 53.

The male protrusions 53 and the female recesses 54 are defined in the plane of arrangement of the supporting body 2.

The shape structure of the male protrusions 53 and of the female recesses 54 are adapted to prevent the uncoupling of the coupled plate-like elements 50*a*, 50*b*, etc. if they are subjected to a separation force between the two plate-like elements 50*a*, 50*b*, thus preventing any involuntary uncouplings from occurring.

Furthermore, the male protrusions 53 support at least one respective engagement body 40.

Preferably, the first and the at least one second plate-like element 50*a*, 50*b* have the same shape.

With reference to the embodiments shown in FIGS. 14 to 21, all the plate-like elements 50*a*, 50*b* have the same shape and can be coupled in a modular fashion in order to obtain supporting bodies 2 that have the desired dimensions.

In this manner it is possible to drastically reduce the number of molds necessary for production, while at the same time ensuring the possibility of providing supporting bodies 2 of extremely varied shapes.

Advantageously, the plate-like elements 50*a*, 50*b* have a perimeter edge 52 that is substantially polygonal; each side of the perimeter edge 52 of a plate-like element 50*a* defines male protrusions 53 and female recesses 54 (in general at least one male protrusion 53 and at least one female recess 54) which can be coupled with respective female recesses 54 and male protrusions 53 defined on a side of a perimeter edge 52 of another plate-like element 50*b* to be coupled.

Conveniently, as shown in the figures, the perimeter edge 52 has a substantially rectangular extension.

More preferably, the length of the longer side of the perimeter edge 52 is a multiple of the length of the shorter side so as to be able to couple the plate-like elements 50*a*, 50*b* with their longer sides arranged parallel and/or perpendicular.

Conveniently, the male protrusions 53 can be coupled to and uncoupled from the female recesses 54 and vice versa, via a relative movement along a direction for coupling and uncoupling 200 which is substantially perpendicular to the plane of arrangement of the plate-like elements 50*a*, 50*b*.

The use of the system 1, according to the invention, is the following.

The supporting body 2 which defines the anchoring region 3 is usually accommodated on a wall and the user identifies, according to the components to be installed, the best position for each component 10 on the anchoring region 3.

At this point, the user arranges, along the vertical plane defined by the anchoring region 3, each component 10, or the supporting bodies 11, using the detachably coupling means which are substantially constituted by the coupling bodies 41 and by the engagement bodies 40.

At this point the user, using the stably anchoring means 20, locks the component 10 (or the supporting body 11) in position by tightening the screws 21 in the openings 41*a* and 40*a*.

Among other things, if during installation it is necessary to change the position of a component that is already fixed, it will be possible to unscrew the screws 21 and recouple the coupling bodies 41 to respective engagement bodies 40 arranged in a region that is more suitable for the purpose.

By virtue of the ability to use for example self-tapping screws, the present embodiment ensures an extremely stable connection and, at the same time, also the ability to uncouple the coupling bodies 41 from the respective engagement body 40, among other things being able to work from an extremely convenient position in that the openings 40*a* and 41*a* are arranged head-on, about an axis perpendicular to the anchoring region 3.

The ability to use, in order to provide stable anchoring, an additional element (for example the self-tapping screw) further makes it possible to considerably simplify the provision of the engagement bodies 40 and of the coupling bodies 41, which need not be designed to be supplied with their own mutual locking means, such as for example an elastically loaded pivot, but can simply be shaped like a male peg and a female seat.

The use of a self-tapping screw to provide the means for stably anchoring further makes it possible to effectively ensure the anchoring, with no possibility of accidental detachments, even if the component 10 should be subjected to forces of considerable intensity.

In practice it has been found that the invention fully achieves the intended aim and objects by providing a system for fixing that is capable of enabling an extremely flexible positioning of the components to be installed.

The invention thus conceived is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The invention claimed is:

1. A system for fixing components of fluid distribution units comprises:

a supporting body defining an anchoring region; and fixing means for fixing at least one component to said anchoring region, said fixing means comprising detachably coupling means for detachably coupling said at least one component to said anchoring region in order to position said at least one component at a desired position defined on said anchoring region, and stably anchoring means for anchoring said component at said desired position, said detachably coupling means comprising a plurality of engagement bodies which are defined at said anchoring region and are arranged mutually spaced apart along substantially mutually parallel rows, and at least one coupling body which is configured to be associated with said component and can be selectively engaged with at least one respective engagement body, said stably anchoring means being configured to stably lock at least one coupling body with the respective engagement body, wherein said respective engagement body comprises a male pivot element which protrudes from said anchoring region and said coupling body comprises a female seat which is detachably engageable with said male pivot element, said stably anchoring means comprising at least one body for connection between a portion of said respective engagement body and a portion of said coupling body, said stably anchoring means comprising an elongated connecting body which can be engaged in respective openings which are defined on said coupling body and on said respective engagement body respectively, and said respective openings extending about respective longitudinal axes of said respective engagement body and of said coupling body.

2. The system according to claim 1, wherein said plurality of engagement bodies is arranged in a matrix on rows and columns which are substantially perpendicular to each other.

3. The system according to claim 1, wherein the engagement bodies between adjacent rows and between adjacent columns are equally spaced apart.

4. The system according to claim 1, wherein said plurality of engagement bodies is made of plastic.

5. The system according to claim 1, wherein said elongated connecting body comprises a self-tapping screw.

6. The system according to claim 1, wherein said supporting body or said component has at least two coupling bodies arranged mutually spaced apart and at a same pitch with respect to a distance between adjacent engagement bodies.

7. The system according to claim 1, wherein said supporting body comprises a first and at least one second plate-like element which have coupling means arranged at a respective perimeter edge, said coupling means being configured, with said first plate-like element and said at least one second plate-like element mutually coupled, to keep the engagement bodies that are arranged mutually adjacent and supported, respectively, by said first and by said second plate-like element at a same pitch.

8. The system according to claim 7, wherein said coupling means comprise a contouring of the respective perimeter edge of said first and second plate-like elements.

9. The system according to claim 8, wherein said contouring comprises male protrusions and female recesses correspondingly contoured to said male protrusions, said male protrusions and said female recesses being defined in a plane of arrangement of said supporting body, said male protrusions supporting at least one respective engagement body.

10. The system according to claim 9, wherein said male protrusions are configured to be coupled to and uncoupled from said female recesses and vice versa, via a relative movement along a direction for coupling and uncoupling which is substantially perpendicular to a plane of arrangement of said first and second plate-like elements.

11. The system according to claim 7, wherein said first and said second plate-like element) have the same shape.

12. The system according to claim 7, wherein said first and second plate-like elements have a perimeter edge that is substantially polygonal, each side of the perimeter edge of a plate-like element defining said male protrusions and said female recesses which can be coupled with respective female recesses and male protrusions defined on a side of a perimeter edge of another plate-like element to be coupled.

13. The system according to claim 12, wherein said perimeter edge is substantially rectangular.

* * * * *